(12) United States Patent
Neal

(10) Patent No.: US 7,857,590 B1
(45) Date of Patent: Dec. 28, 2010

(54) FOLDING ROTOR FOR A ROTORCRAFT

(76) Inventor: Larry R. Neal, P.O. Box 927, Boyd, TX (US) 76023

( * ) Notice: Subject to any disclaimer, the term of this patent is extended or adjusted under 35 U.S.C. 154(b) by 806 days.

(21) Appl. No.: 11/891,828

(22) Filed: Aug. 13, 2007

Related U.S. Application Data

(60) Provisional application No. 60/836,980, filed on Aug. 11, 2006.

(51) Int. Cl.
*B64C 11/28* (2006.01)
(52) U.S. Cl. .............. 416/142; 416/134 A; 416/210 R
(58) Field of Classification Search .......... 416/131, 416/142, 143, 140, 141, 134 A, 210 R
See application file for complete search history.

(56) References Cited

U.S. PATENT DOCUMENTS

| | | | |
|---|---|---|---|
| 2,815,820 A | 12/1957 | Papadakos | |
| 3,743,441 A * | 7/1973 | Ferris | 416/143 |
| 4,028,000 A | 6/1977 | Weiland et al. | |
| 4,268,222 A | 5/1981 | Bernard | |
| 4,369,019 A | 1/1983 | Lovera et al. | |
| 4,436,483 A | 3/1984 | Watson | |
| 4,466,775 A | 8/1984 | Martin | |
| 5,211,538 A | 5/1993 | Seghal et al. | |
| 5,228,834 A | 7/1993 | Yamamoto et al. | |
| 5,263,821 A * | 11/1993 | Noehren et al. | 416/97 R |
| 5,782,606 A * | 7/1998 | Mondet et al. | 416/142 |
| 6,126,398 A | 10/2000 | Bauer et al. | |
| 6,213,712 B1 | 4/2001 | Muylaert | |
| 6,485,261 B2 | 11/2002 | Mondet et al. | |
| 6,752,596 B2 | 6/2004 | Mondet et al. | |
| 6,783,327 B1 | 8/2004 | Davis | |
| 6,860,450 B2 | 3/2005 | Muylaert et al. | |

* cited by examiner

*Primary Examiner*—Igor Kershteyn
(74) *Attorney, Agent, or Firm*—Eric Karich

(57) ABSTRACT

A folding rotor has a hub bar pivotally connected to a rotor blade. The hub bar is adapted to be connected to the rotorcraft, and includes a first locking aperture having a resilient bushing. The rotor blade includes a rotor strap that extends to a mounting element having a second locking aperture. A hinge element hingably connects the hub bar to the mounting element to enable the rotor blade to pivot with respect to the hub bar between a folded position and an extended position. The first and second locking apertures and the resilient bushing are coaxially aligned when the rotor blade is in the extended position, so that a locking pin may be positioned therethrough to lock the rotor blade in the extended position.

5 Claims, 3 Drawing Sheets

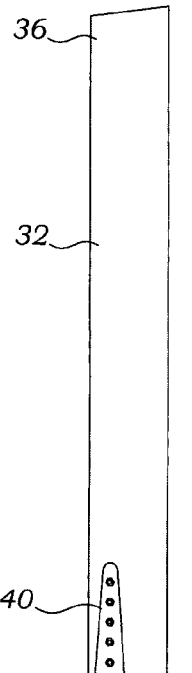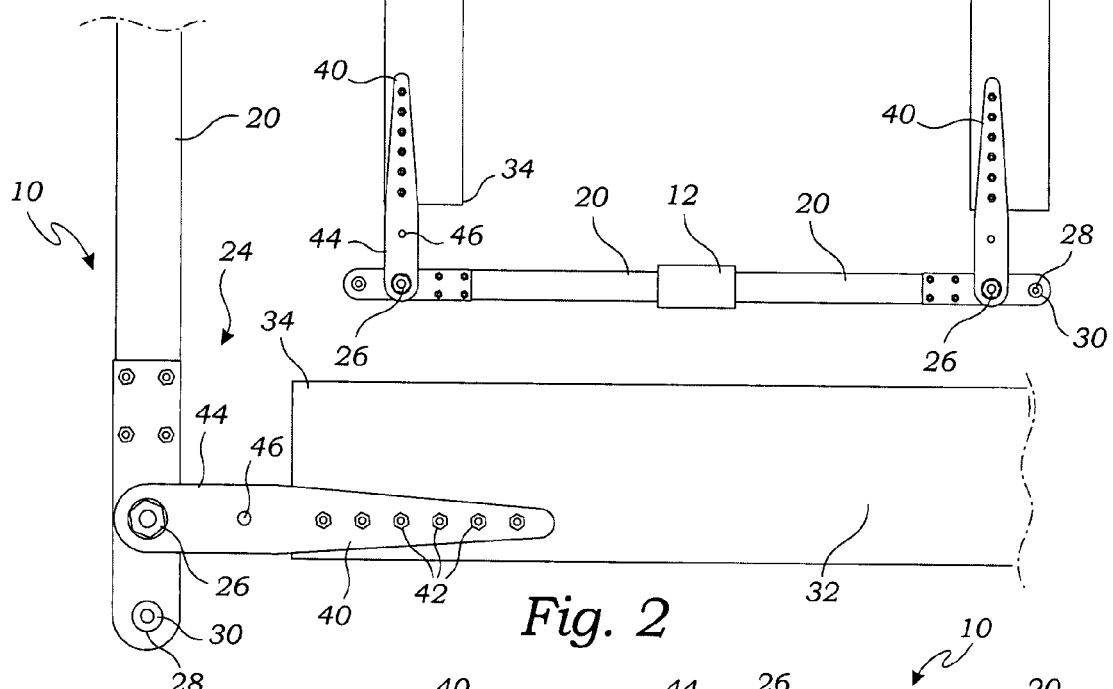

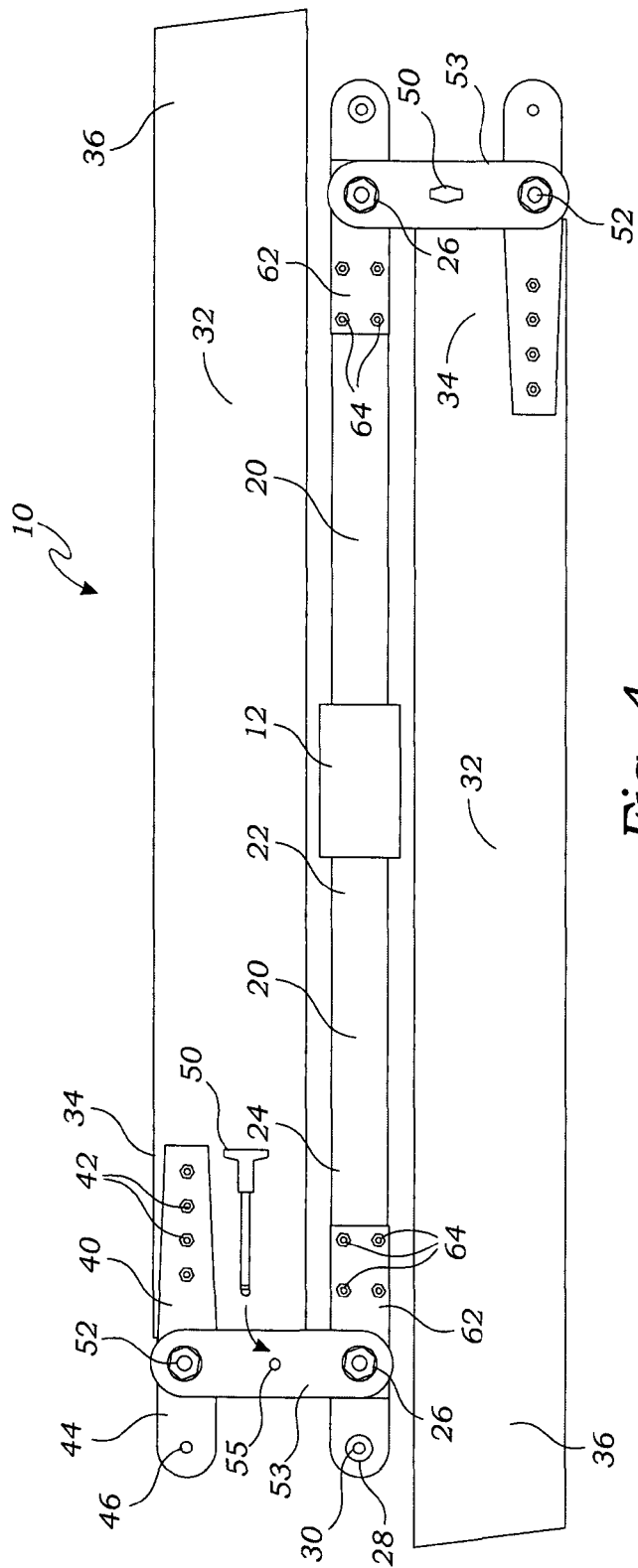
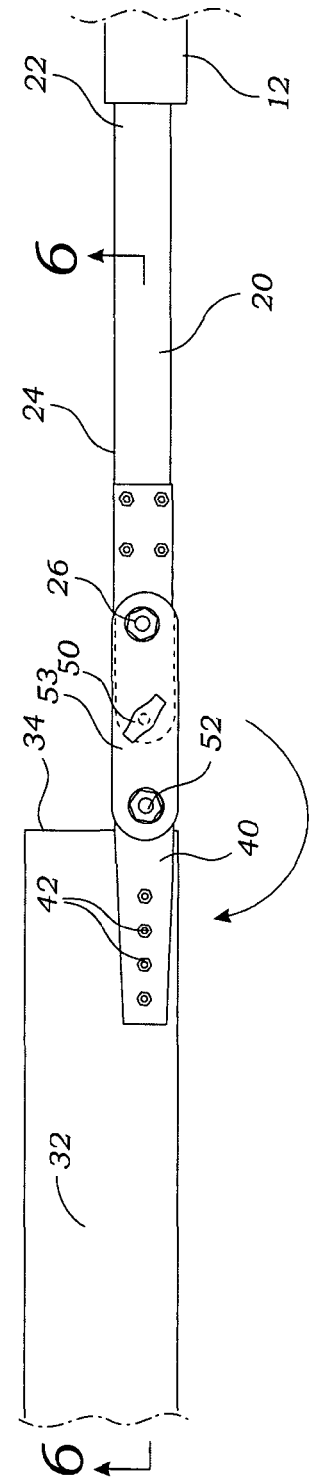
Fig. 4
Fig. 5

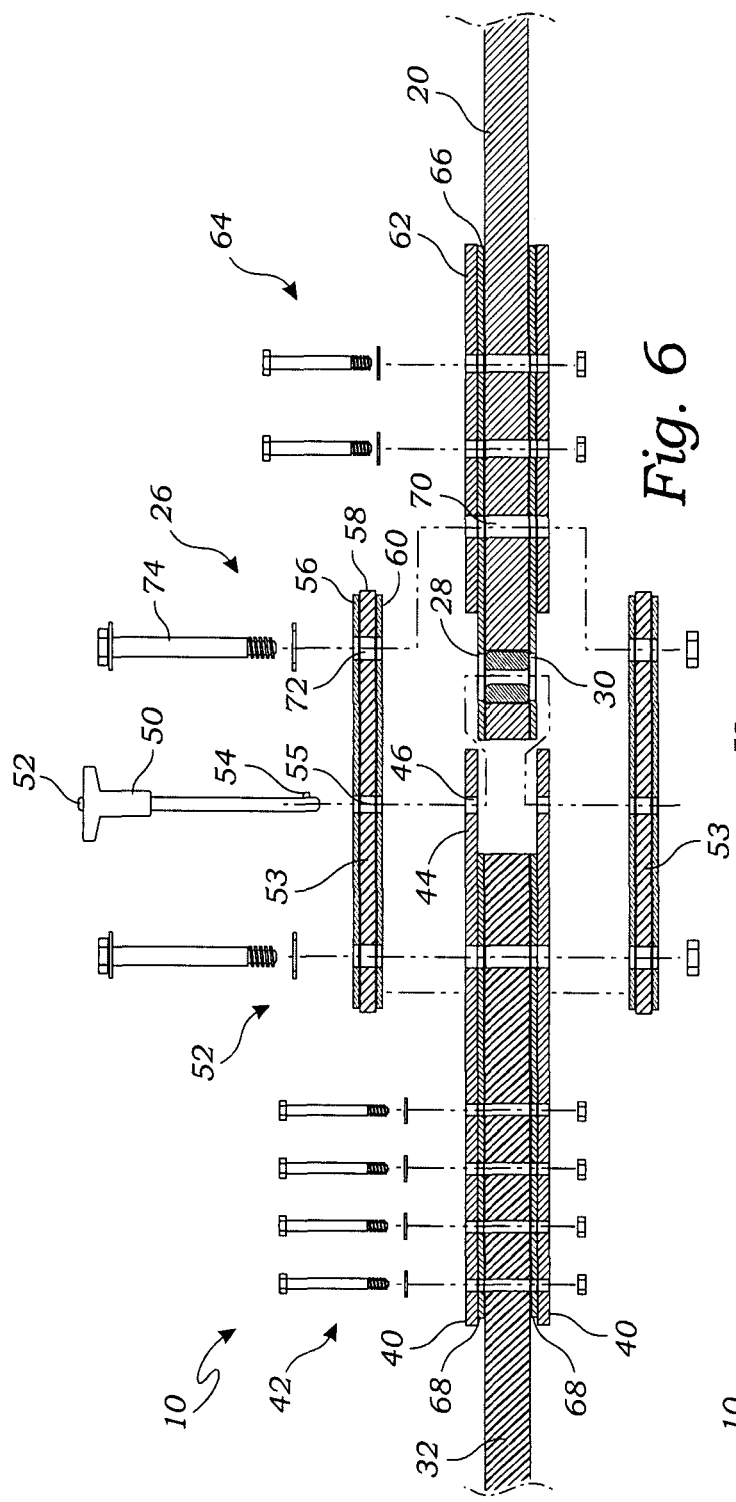
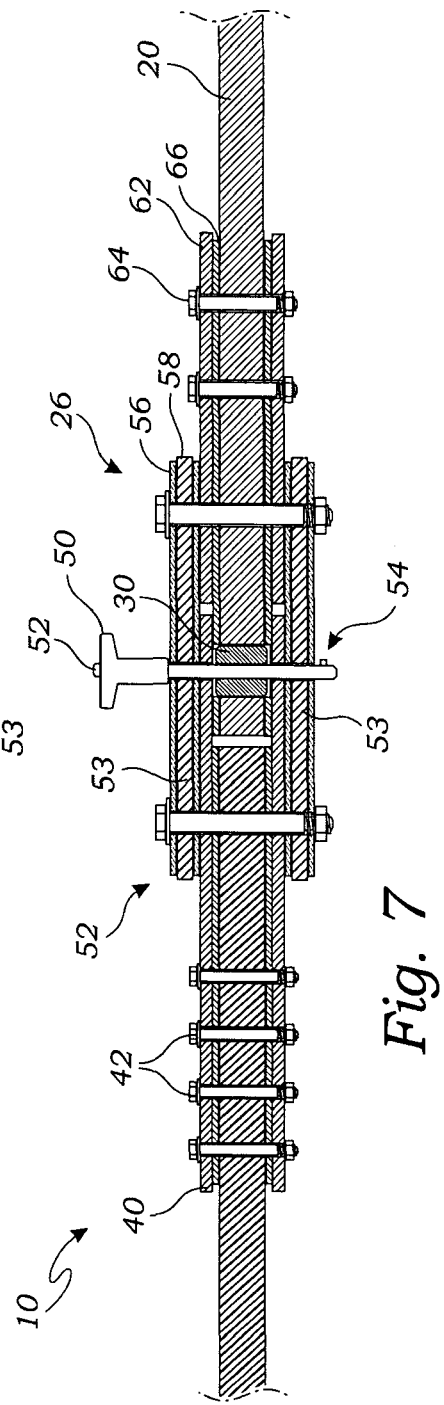

FOLDING ROTOR FOR A ROTORCRAFT

CROSS-REFERENCE TO RELATED APPLICATIONS

This application for a utility patent claims the benefit of U.S. Provisional Application No. 60/836,980, filed Aug. 11, 2006.

STATEMENT REGARDING FEDERALLY SPONSORED RESEARCH

Not Applicable

BACKGROUND OF THE INVENTION

1. Field of the Invention

This invention relates generally to rotors for rotorcraft, and more particularly to a rotor that can be folded so that the rotorcraft may be more easily stored, and may also be driven as a land vehicle.

2. Description of Related Art

The following art defines the present state of this field:

Weiland et al., U.S. Pat. No. 4,028,000, teaches a resilient drive for a helicopter rotor blade. The rotor blade is pivotally supported on a stub shaft which is in turn supported on the rotor hub. A shoulder projects from the rotor blade and a rectangular hollow frame is fixed to the stub shaft. The shoulder projects into the hollow frame. Threaded means acting through resilient means holds the first and second means in selected pivotal adjustment with respect to each other but the resilient component thereof permits sufficient slight lead lag movement therebetween as to effect damping of the lead lag mode of the rotorblade. The adjustment capability permits sufficient adjustment of the blade with respect to the hub to ensure desired balance between the several blades of a given rotor.

Bernard, U.S. Pat. No. 4,268,222, teaches a folding rotor having a star-shaped hub with arms flexible in the direction perpendicular to the plane of the star-shaped hub. A housing is detachably mounted on the rigid central part of the rotor hub. The housing carries elongate supports on a side. The free end of each support is detachably joined to the upper part of the folding shaft of the corresponding blade. This folding shaft can consist of a spindle replacing a link shaft between the foot of the blade and the corresponding arm of the hub.

Lovera et al., U.S. Pat. No. 4,369,019, teaches a helicopter rotor having elastomer joints, in which each blade is connected to a rotatable hub by means of a yoke constituted by a single U-shaped piece and mounted through a relative aperture provided in said hub; each yoke being connected to a transverse arm outwardly bordering said aperture, by means of a U stirrup embracing the relative said arm and provided with two overlying appendices extending outwards and having two surfaces inclined towards the other and acting as stop surfaces for two rocker arms constituting a device for controlling the flapping movements of said blade; said two rocker arms being mounted rotatable in a substantially vertical plane passing through the axis of the relative blade and being supported by a lever for controlling the pitch of this latter.

Bauer et al., U.S. Pat. No. 6,126,398, teaches a rotor blade for a bearingless rotor of a helicopter. The rotor includes a lift-generating airfoil blade, a flexbeam connecting the airfoil blade to a rotor head, and a control sleeve enclosing the flexbeam. The junction between the flexbeam and to the airfoil blade is a separable junction to allow the airfoil blade to be folded in a simple manner while maintaining a high lead-lag stiffness and reduced structural height of the junction. The junction is formed by two connection arms arranged side-by-side in the lead-lag plane of the rotor blade. Preferably, the two connection arms extend from the inboard end of the airfoil blade and receive the head of the flexbeam therebetween lying in the lead-lag plane. A connecting fixture connects the connection arms to the flexbeam head using fasteners such as bolts that are spaced laterally from each other at a spacing distance of at least 1.3 times the maximum width of the torsionally flexible portion of the flexbeam.

Muylaert, U.S. Pat. No. 6,213,712, teaches an improved blade positioning mechanism for folding a helicopter blade attached to a pitch control housing that permits a controlled folding of the main rotor blade. The invention also folds the main rotor blade while the blade remains attached to the pitch control housing, thus eliminating the need to rebalance the blade.

Davis, U.S. Pat. No. 6,783,327, teaches blade fold hinge units attachable between each helicopter blade and its hub attachment point, while maintaining continuity of mechanical connection of each blade to its hub portion. A two portion hinge unit has a first portion for blade attachment and a second portion for hub attachment. The first and second portions are hinged via a transverse pin to enable blade drooping downward, before or after a blade is pivoted to an aft position for helicopter storage or shipment. Upon aft pivoting of a blade, undesired further pivoting or knuckling of the hinge unit relative to the hub is prevented by addition of a lock link. After blade folding, the blades may be suitably fixed in position adjacent the aft portion of the helicopter body.

Watson, U.S. Pat. No. 4,436,483, teaches a helicopter rotor that includes a powered blade fold mechanism adapted to move a rotor blade between a spread operational position and a folded position and at least one lock pin to lock the blade in its spread position. The mechanism includes a rotary power source and a mechanical linkage having an over-center position and adapted so that energization of the power source in one direction moves the linkage through the over-center position to withdraw the lock pin and fold the blade, and energization in the other direction moves the blade to the spread position and re-inserts the lock pin automatically as the linkage moves back through its over-center position. Lock means may be provided to lock the blade in pitch and, in one embodiment particularly adapted for use in an articulated rotor, the lock means includes pitch, flap and lag locks.

Martin, U.S. Pat. No. 4,466,775, teaches a helicopter rotor having a rotor hub and a plurality of rotor blades. The rotor includes for each blade a blade fold mechanism comprising a reversible rotary power source and a rack and pinion mechanism adapted to operate one or more lock pins and to fold the blades between an operational spread position and a folded position.

Seghal et al., U.S. Pat. No. 5,211,538, teaches a method of folding the main rotor blades of a helicopter for storage in which blade supports are removably attached to the nose and tail of the fuselage of the helicopter. A first and second main rotor blades then are aligned with the longitudinal axis running from the forward blade support to the aft blade support. The first and second blades are placed upon, and restrained from rotation in, the blade supports. Then the first and second blades are permitted to fold about the rotor assembly of the helicopter by releasing a locking member of each blade.

Other patents of interest include Muylaert et al., U.S. Pat. No. 6,860,450, Mondet et al., U.S. Pat. No. 6,485,261, Papadakos, U.S. Pat. No. 2,815,820, and Mondet et al., U.S. Pat. No. 6,752,596. These and the other above-described references are hereby incorporated by reference in full.

The prior art teaches various forms of folding rotors. However, the prior art does not teach folding rotors that are connected through a linkage including a resilient. The present invention fulfills these needs and provides further related advantages as described in the following summary.

SUMMARY OF THE INVENTION

The present invention teaches certain benefits in construction and use which give rise to the objectives described below.

The present invention provides a folding rotor adapted to be mounted on a rotorcraft. The folding rotor comprises a hub bar and a rotor blade having a rotor strap. The hub bar has a proximal end and a distal end. The proximal end is adapted to be connected to the rotorcraft, and the distal end has a first locking aperture having a resilient bushing. The rotor blade has an inner end and an outer end. A rotor strap is attached to the inner end of the rotor blade, and the rotor strap extends to a mounting element having a second locking aperture. A hinge element hingably connects the distal end of the hub bar to the mounting element of the rotor strap to enable the rotor blade to pivot with respect to the hub bar between a folded position and an extended position. The first and second locking apertures and the resilient bushing are coaxially aligned when the rotor blade is in the extended position, so that a locking pin may be positioned through the first and second locking apertures and the resilient bushing to lock the rotor blade in the extended position.

A primary objective of the present invention is to provide a folding rotor having advantages not taught by the prior art.

Another objective is to provide a folding rotor that can be folded from an extended position to a folded position.

Another objective is to provide a folding rotor that includes a resilient bushing in the mounting of the rotor blade that functions to absorb vibrations.

A further objective is to provide a folding rotor that includes a resilient bushing that allows the rotor blade to be mounted and extended without requiring any delicate calibration of the blade.

Other features and advantages of the present invention will become apparent from the following more detailed description, taken in conjunction with the accompanying drawings, which illustrate, by way of example, the principles of the invention.

BRIEF DESCRIPTION. OF THE DRAWING

The accompanying drawings illustrate the present invention. In such drawings:

FIG. 1 is a top plan view of a pair of folding rotors according to a first embodiment of the present invention;

FIG. 2 is a top plan view of one of the folding rotors, illustrating the folding rotor in a folded position;

FIG. 3 is a top plan view of similar to FIG. 2, illustrating the folding rotor in an extended position;

FIG. 4 is a top plan view of a second embodiment of the pair of folding rotors;

FIG. 5 is a top plan view thereof, illustrating one of the folding rotors in an extended position;

FIG. 6 is an exploded sectional view thereof taken along line 6-6 in FIG. 5; and FIG. 7 is a sectional view similar to FIG. 6, illustrating the folding rotor once it has been fully assembled.

DETAILED DESCRIPTION OF THE INVENTION

The above-described drawing figures illustrate the invention, a folding rotor 10 adapted to be mounted on a rotorcraft 12.

FIG. 1 is a top plan view of a pair of the folding rotors 10 according to a first embodiment of the present invention. FIG. 2 is a top plan view of one of the folding rotors 10, illustrating the folding rotor 10 in a folded position. In the folded position, the folding rotor 10 is well suited for transport and/or storage, and is particularly suitable for use in a vehicle adapted to be both flown and driven. FIG. 3 is a top plan view of similar to FIG. 2, illustrating the folding rotor 10 in an extended position, wherein the folding rotor 10 is suitable for flight. Importantly, the folding rotor 10 may be moved to the extended position without calibration of the folding rotor 10, due to the novel construction of the hinge mechanism described below.

As shown in FIGS. 1-3, the folding rotor 10 comprises a hub bar 20 connected with a rotor blade 32. The hub bar 20 includes a proximal end 22 and a distal end 24, and is generally similar in construction to prior art hub bars, except as described herein. The proximal end 22 is adapted to be connected to the rotorcraft 12 (to a rotor head), as is well known in the art and thus not described in greater detail herein.

A first locking aperture 28 extends through the distal end 24 of the hub bar 20. A resilient bushing 30 is adapted to fit within the first locking aperture 28. The function of the resilient bushing 30 is described in greater detail below.

The rotor blade 32 includes an inner end 34 and an outer end 36, and is adapted for providing lift for the rotorcraft 12, as is well known in the art. A rotor strap 40 is attached to the inner end 34 of the rotor blade 32 using structures and methods well known in the art, in the present case a plurality of fasteners 42. The rotor strap 40 extends to a mounting element 44 having a second locking aperture 46.

A hinge element 26 hingably connects the distal end 24 of the hub bar 20 to the mounting element 44 of the rotor strap 40 to enable the rotor blade 32 to pivot with respect to the hub bar 20 between a folded position and an extended position. The construction of the hinge element 26 in the preferred embodiment is described in greater detail below; however, the structure of the hinge element may be altered by those skilled in the art, and such alternative constructions should be considered within the scope of the invention.

When the rotor blade 32 is in the extended position, the first and second locking apertures 28 and 46 and the resilient bushing 30 are coaxially aligned so that a locking pin 50 may be positioned through the first and second locking apertures 28 and 46 and the resilient bushing 30 to lock the rotor blade 32 in the extended position. The second locking aperture 28 preferably fits the pin 50 tightly, while the first locking aperture 28 is larger, so that the pin 50 bears against the resilient bushing 30 and the bushing 30 may absorb vibrations and small movements of the rotor blade 32 with respect to the hub bar 20. The resilient bushing 30 is preferably constructed of rubber or other suitably resilient material for absorbing the vibrations and movements.

FIG. 4 is a top plan view of a second embodiment of the pair of folding rotors 10 in the folded position. FIG. 5 is a top plan view illustrating one of the folding rotors 10 in an extended position. FIG. 6 is an exploded sectional view thereof taken along line 6-6 in FIG. 5. FIG. 7 is a sectional view similar to FIG. 6, illustrating the folding rotor 10 once it has been fully assembled.

As illustrated in FIGS. 4-7, in the second embodiment, the mounting element 44 of the rotor strap 40 further comprises a folding link 53 hingably attached to the rotor strap 40 with a second hinge element 57. The folding link 53 forms the hinge element 26 with the distal end 24 of the hub bar 20. The folding link 53 includes a pin aperture 55 positioned so that the locking pin 50 may be positioned through the folding link 53, the first and second locking apertures 28 and 46, and the resilient bushing 30, to lock the rotor blade 32 in the extended position.

The locking pin 50 preferably includes a push button 52 to actuate a locking post 54 for locking the locking pin 50 in place. The term locking pin 50, however, is hereby defined to include any form of pin, bolt, or other form of fastener that functions as described, and which may include any form of locking bolt, clip, or fastener (not shown) for holding the pin in place.

The folding link 53 preferably includes a steel layer 56, an aluminum layer 58, and a nylon layer 60. The steel layer 56 provides strength, while the aluminum layer 58 provides the necessary rigidity without adding an undue amount of weight. The nylon layer 60 functions to resist wear and friction between the folding link 53 and other components, and is hereby defined to include any form of material that is suitable for this purpose. The rotor blade 32 preferably also includes a similar nylon layer 68, and another nylon layer 666 is preferably positioned between a spacer 62 attached to the hub bar 20 with bolts 64 (hereby defined to include any suitable fasteners of this nature).

The hinge element 26 preferably comprises a first hinge aperture 70 through the distal end 24 of the hub bar 20; a second hinge aperture 72 through the mounting element 44 of the rotor strap 40; and a pivot fastener 74 adapted to extend through the first and second hinge apertures 70 and 72 to pivotally engage the hub bar 20 with the rotor strap 40. As mentioned above, this construction may vary, and alternative constructions should be considered within the scope of the present invention. The second hinge element 57 is preferably similarly constructed; however, this element also may vary, and alternatives should be considered within the scope of the present invention.

While at least one preferred embodiment of the present invention is illustrated above, it should be understood that the presently claimed invention includes alternative embodiments that could be devised by those skilled in the art. The terminology used in the preceding description should be construed to include not only the words used above, but also similar or equivalent words, and alternative embodiments that would be considered obvious to one skilled in the art given the teachings of the present patent application. Additionally, the words "a," "an," and "one" are defined to include one or more of the referenced item unless specifically stated otherwise. Also, the terms "have," "include," "contain," and similar terms are defined to mean "comprising" unless specifically stated otherwise.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A folding rotor adapted to be mounted on a rotorcraft, the folding rotor comprising:
    a hub bar having a proximal end and a distal end, the proximal end being adapted to be connected to the rotorcraft;
    a first locking aperture in the distal end of the hub bar;
    a resilient bushing adapted to fit within the first locking aperture;
    a rotor blade having an inner end and an outer end;
    a rotor strap attached to the inner end of the rotor blade, the rotor strap extending to a mounting element having a second locking aperture;
    a hinge element hingably connecting the distal end of the hub bar to the mounting element of the rotor strap to enable the rotor blade to pivot with respect to the hub bar between a folded position and an extended position, wherein the first and second locking apertures and the resilient bushing are coaxially aligned when the rotor blade is in the extended position; and
    a locking pin adapted to be positioned through the first and second locking apertures and the resilient bushing to lock the rotor blade in the extended position.

2. The folding rotor of claim 1, wherein the mounting element of the rotor strap further comprises a folding link hingably attached to the rotor strap with a second hinge element, wherein the folding link forms the hinge element with the distal end of the hub bar, and wherein the folding link includes a pin aperture positioned so that the locking pin may be positioned through the folding link, the first and locking apertures, and the resilient bushing, to lock the rotor blade in the extended position.

3. The folding rotor of claim 1, wherein the hinge element comprises:
    a first hinge aperture through the distal end of the hub bar;
    a second hinge aperture through the mounting element of the rotor strap; and
    a pivot fastener adapted to extend through the first and second hinge apertures to pivotally engage the hub bar with the rotor strap.

4. A folding rotor adapted to be mounted on a rotorcraft, the folding rotor comprising:
    a hub bar having a proximal end and a distal end, the proximal end being adapted to be connected to the rotorcraft;
    a first locking aperture in the distal end of the hub bar;
    a resilient bushing adapted to fit within the first locking aperture;
    a rotor blade having an inner end and an outer end;
    a rotor strap attached to the inner end of the rotor blade, the rotor strap extending to a mounting element having a second locking aperture;
    a folding link hingably attached to the rotor strap with a second hinge element, the folding link having a pin aperture;
    a hinge element hingably connecting the distal end of the hub bar to the folding link to enable the rotor blade to pivot with respect to the hub bar between a folded position and an extended position, wherein the pin aperture, the first and second locking apertures, and the resilient bushing are coaxially aligned when the rotor blade is in the extended position; and
    a locking pin adapted to be positioned through the pin aperture, the first and second locking apertures, and the resilient bushing to lock the rotor blade in the extended position.

5. The folding rotor of claim 4, wherein the hinge element comprises:
    a first hinge aperture through the distal end of the hub bar;
    a second hinge aperture through the mounting element of the rotor strap; and
    a pivot fastener adapted to extend through the first and second hinge apertures to pivotally engage the hub bar with the rotor strap.

* * * * *